US012316015B2

(12) United States Patent
Ayala Vazquez et al.

(10) Patent No.: US 12,316,015 B2
(45) **Date of Patent: *May 27, 2025**

(54) ELECTRONIC DEVICES WITH MULTIPLE LOW BAND ANTENNAS

(71) Applicant: Apple Inc., Cupertino, CA (US)

(72) Inventors: Enrique Ayala Vazquez, Watsonville, CA (US); Xu Han, Cupertino, CA (US); Hongfei Hu, Cupertino, CA (US); Ming Chen, Cupertino, CA (US); Jingni Zhong, Santa Clara, CA (US); Erdinc Irci, Sunnyvale, CA (US); Salih Yarga, Sunnyvale, CA (US); Mohsen Salehi, San Jose, CA (US); Carlo Di Nallo, Belmont, CA (US); Ming-Ju Tsai, Sunnyvale, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 17/832,427

(22) Filed: Jun. 3, 2022

(65) Prior Publication Data

US 2023/0291125 A1 Sep. 14, 2023

Related U.S. Application Data

(63) Continuation of application No. 17/694,486, filed on Mar. 14, 2022.

(51) Int. Cl.

| | |
|---|---|
| ***H01Q 1/24*** | (2006.01) |
| ***H01Q 1/38*** | (2006.01) |
| ***H01Q 21/28*** | (2006.01) |

(52) U.S. Cl.

CPC ............ *H01Q 21/28* (2013.01); *H01Q 1/241* (2013.01); *H01Q 1/38* (2013.01)

(58) Field of Classification Search

CPC ........... H01Q 21/28; H01Q 1/241; H01Q 1/38

See application file for complete search history.

(56) References Cited

U.S. PATENT DOCUMENTS

| | | | |
|---|---|---|---|
| 6,501,415 | B1 | 12/2002 | Viana et al. |
| 7,471,175 | B2 | 12/2008 | Voss |
| 8,711,040 | B2 | 4/2014 | Barbieri et al. |
| 9,203,139 | B2 | 12/2015 | Zhu et al. |
| 9,350,069 | B2 | 5/2016 | Pascolini et al. |

(Continued)

*Primary Examiner* — David E Lotter

(74) *Attorney, Agent, or Firm* — Treyz Law Group, P.C.; Michael H. Lyons

(57) ABSTRACT

An electronic device may include first and second antennas formed from respective first and second segments of a housing. The first antenna may have a first feed coupled to the first segment by a first switch and coupled to the first segment by a first conductive trace. The second antenna may have a second feed coupled to the second segment by a second switch and coupled to the second segment by a second conductive trace. The first segment may be separated from the second segment by a single gap, a data connector may pass through the second segment, and the antennas may selectively cover a low band. Alternatively, the first segment may be separated from the second segment by a third segment and two gaps, the data connector may pass through the third segment, and the first and second antennas may concurrently cover the low band.

17 Claims, 9 Drawing Sheets

(56) References Cited

U.S. PATENT DOCUMENTS

| | | | |
|---|---|---|---|
| 10,476,167 B2 | 11/2019 | Ayala Vazquez et al. | |
| 10,561,842 B2 | 2/2020 | Yeh et al. | |
| 11,205,834 B2 | 12/2021 | Ayala Vazquez et al. | |
| 11,322,840 B2 | 5/2022 | Wang et al. | |
| 2019/0027833 A1* | 1/2019 | Ayala Vazquez | H01Q 5/342 |
| 2021/0377372 A1* | 12/2021 | Jung | H04M 1/0216 |
| 2022/0069468 A1* | 3/2022 | Hsu | H01Q 5/20 |
| 2022/0247070 A1* | 8/2022 | Lee | H01Q 1/523 |

* cited by examiner

ELECTRONIC DEVICES WITH MULTIPLE LOW BAND ANTENNAS

This application is a continuation of U.S. patent application Ser. No. 17/694,486, filed Mar. 14, 2022, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing having peripheral conductive housing structures. The wireless circuitry may include first and second antennas. The first antenna may have a resonating element arm formed from a first segment of the peripheral conductive housing structures. The second antenna may have a resonating element arm formed from a second segment of the peripheral conductive housing structures. The first and second segments may be separated from ground by a slot.

The first antenna may have a first positive antenna feed terminal coupled to a first point on the first segment by a first switch and coupled to a second point on the first segment by a first conductive trace overlapping the slot. The second antenna may have a second positive antenna feed terminal coupled to a third point on the second segment by a second switch and coupled to a fourth point on the second segment by a second conductive trace overlapping the slot. The conductive traces may be used to feed the first and second segments in a cellular low band. In some arrangements, the first segment may be separated from the second segment by a single gap and a data connector may pass through the second segment. In these examples, only one of the first and second antennas may cover the low band at a given time. In other arrangements, the first segment may be separated from the second segment by a third segment and two gaps. In these examples, the data connector may pass through the third segment and the first and second antennas may concurrently cover the low band.

DETAILED DESCRIPTION

Figure 1:
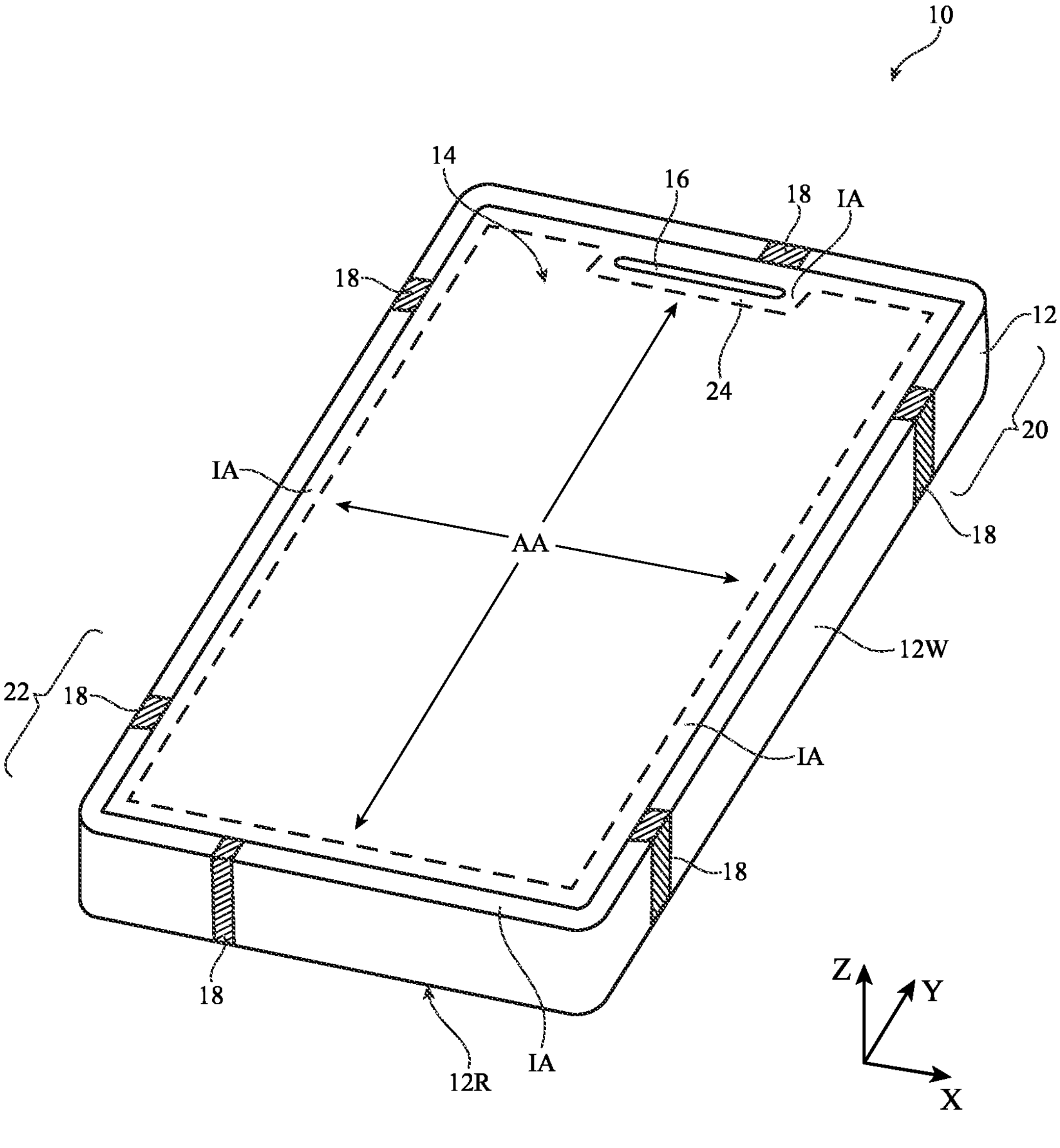
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
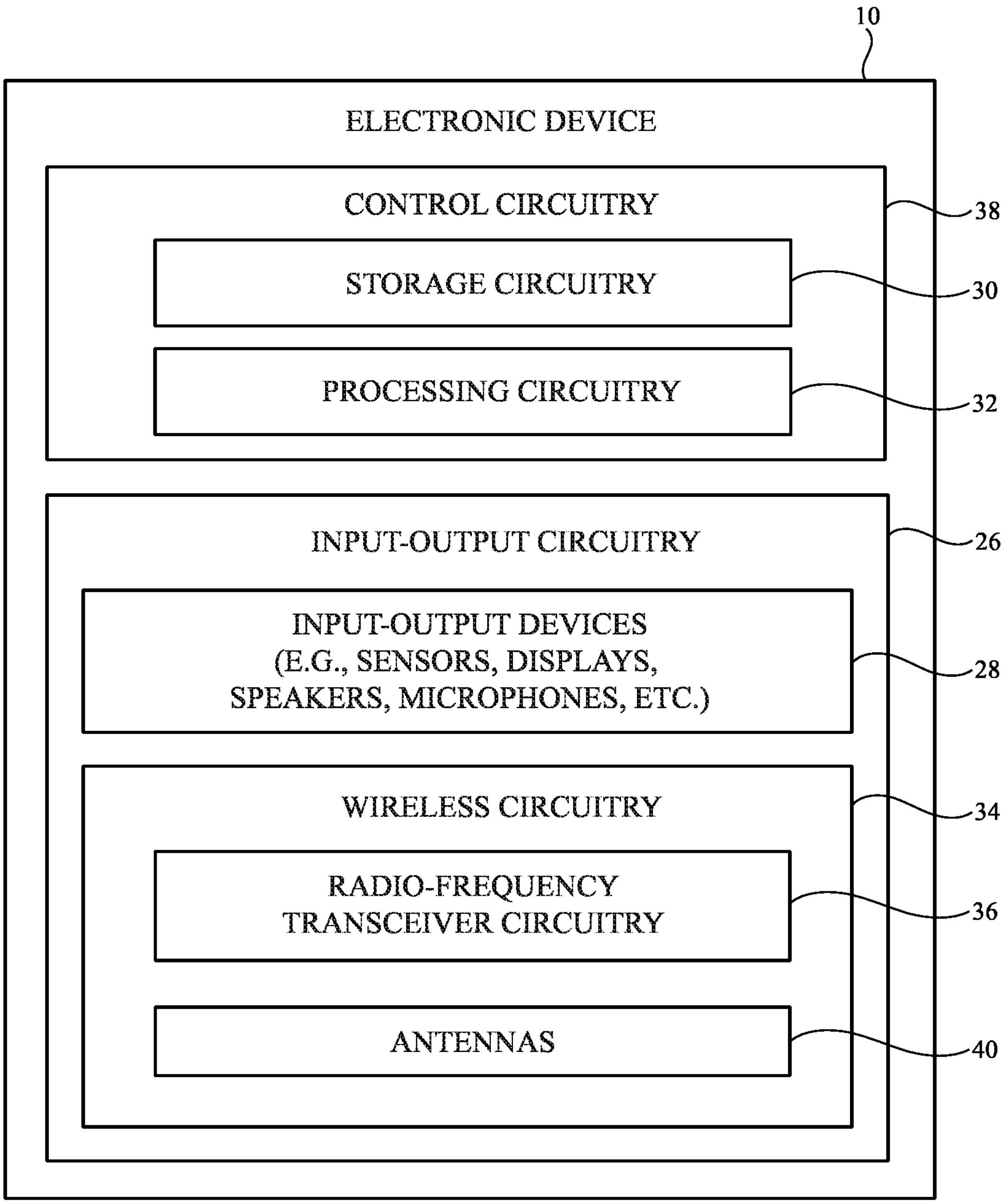
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
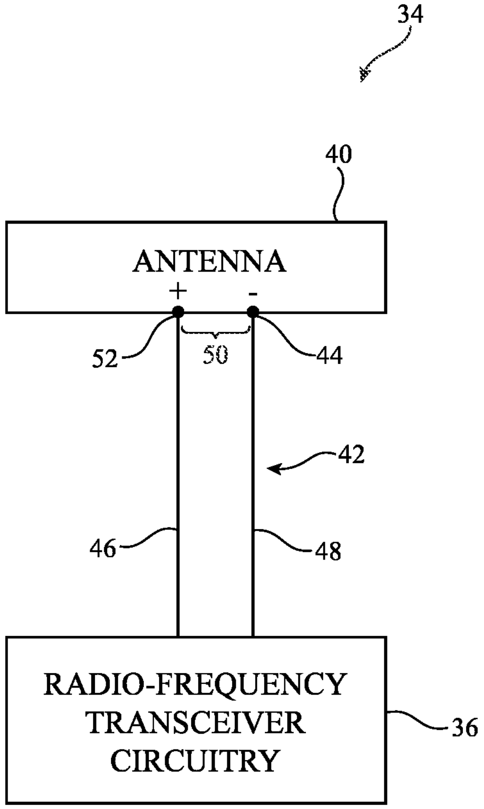
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include an antenna resonating (radiating) element and an antenna ground. Antenna feed 50 may include a positive antenna feed terminal 52 coupled to the antenna resonating element and a ground antenna feed terminal 44 coupled to the antenna ground.

Radio-frequency transceiver circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
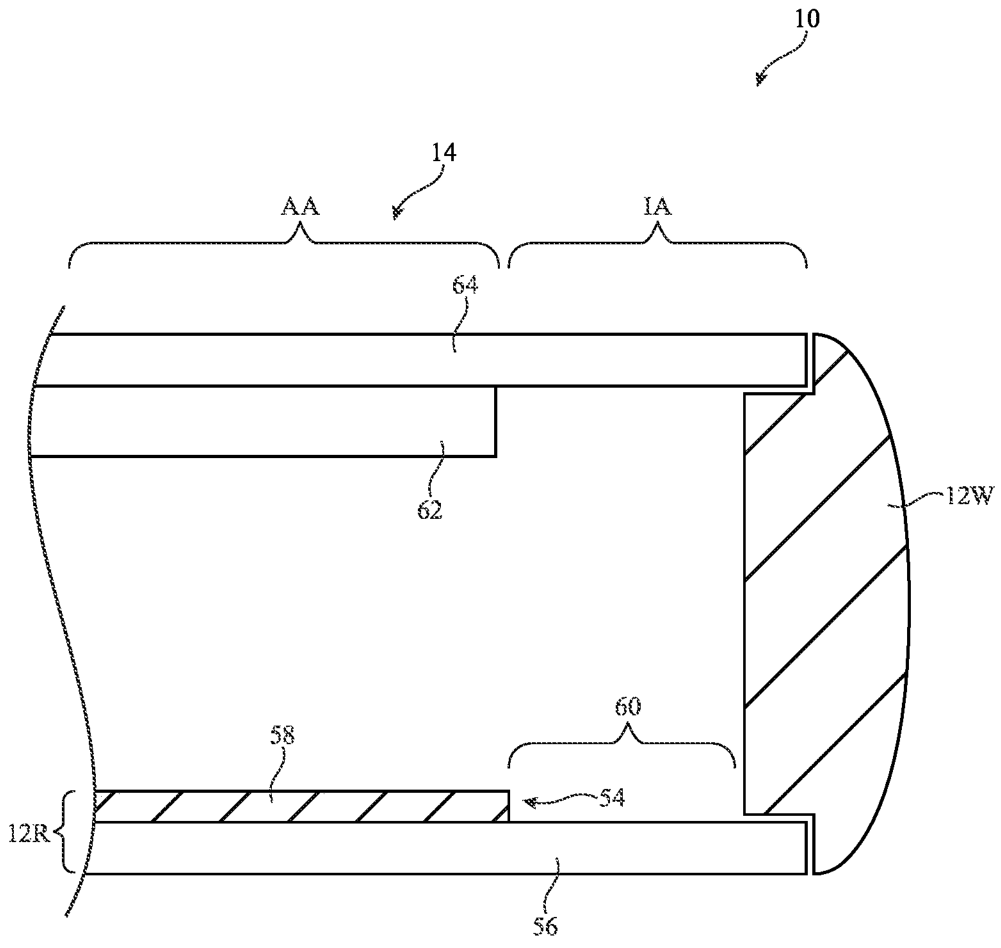
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive support plate 58 may, if desired, provide structural and mechanical support for device 10.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

Conductive housing structures such as conductive support plate 58 and/or peripheral conductive housing structures 12W (e.g., the portion of peripheral conductive housing structures 12W opposite conductive support plate 58 at slot 60) may be used to form antenna structures for one or more of the antennas 40 in device 10. For example, conductive support plate 58 may be used to form the ground plane for one or more of the antennas 40 in device 10 and/or to form one or more edges of slot antenna resonating elements (e.g., slot antenna resonating elements formed from slot 60) for the antennas 40 in device 10. Peripheral conductive housing structures 12W may form an antenna resonating element arm (e.g., an inverted-F antenna resonating element arm) for one or more of the antennas 40 in device 10. If desired, a portion of peripheral conductive housing structures 12W and/or a portion of conductive support plate 58 (e.g., at edge 54 of slot 60) may form part of a conductive loop path used to form a loop antenna resonating element for antenna 40 that conveys radio-frequency signals in an NFC band.

Figure 5:
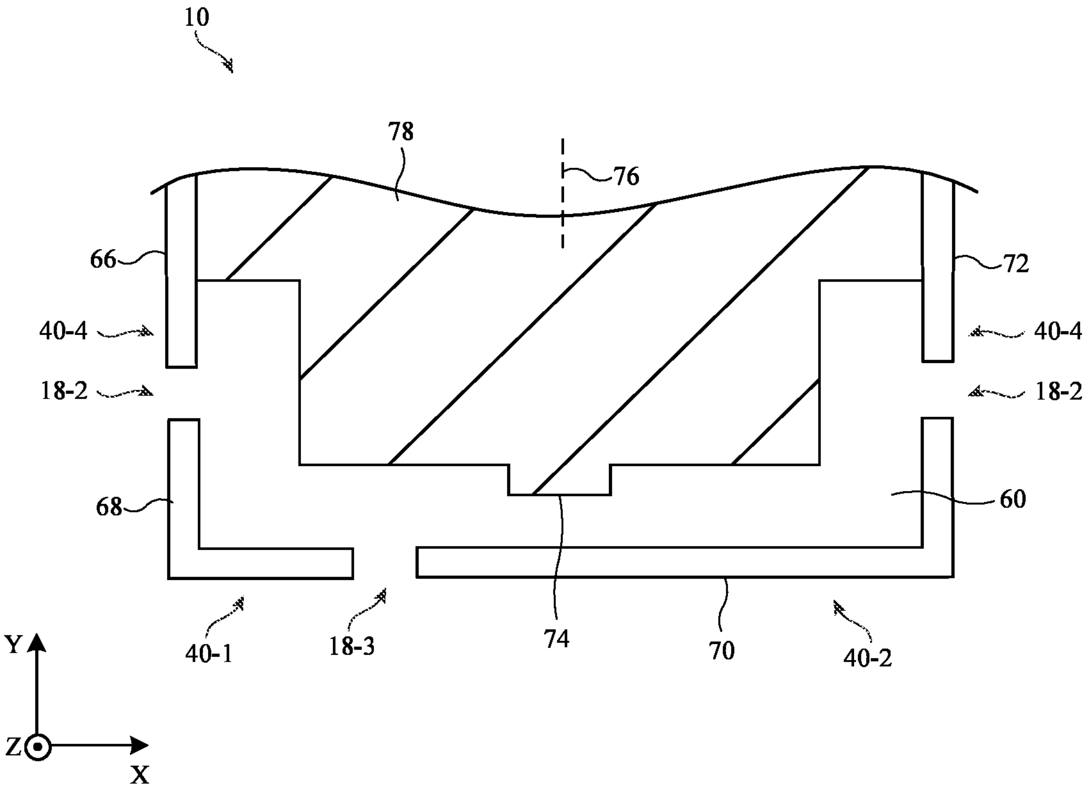
FIG. 5 is a top interior view of the lower end of an illustrative electronic device having peripheral conductive housing structures with a dielectric gap for separating the resonating elements of two antennas in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as a metal layer used to form a rear housing wall and/or an internal support structure for device 10 (e.g., conductive support plate 58 of FIG. 4), conductive traces on a printed circuit board, conductive portions of one or more components in device 10, conductive portions of display module 62 (FIG. 4), conductive interconnect structures that couple two or more of these structures together (e.g., conductive pins, conductive adhesive, welds, conductive tape, conductive foam, conductive springs, etc.), etc.

Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Ground structures 78 may include a ground extension 74 that protrudes into slot 60 and that may, if desired, bridge slot 60 and couple the ground structures to the peripheral conductive housing structures. Ground extension 74 may be formed from a data connector for device 10. Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 68 and having an antenna ground formed from ground structures 78, device 10 may include a second antenna 40-2 having an antenna resonating element formed from segment 70 and having an antenna ground formed from ground structures 78, may have a third antenna 40-3 having a slot antenna resonating element formed from a portion of slot 60 between segment 66 and ground structures 78, and may have a fourth antenna 40-4 having a slot antenna resonating element formed from a portion of slot 60 between segment 72 and ground structures 78. Antennas 40-1 and 40-2 may be, for example, inverted-F antennas having a return path that couples the respective resonating element arms to the antenna ground. Antennas 40-1, 40-2, 40-3, and 40-4 may convey radio-frequency signals in one or more frequency bands. For example, antennas 40-1 and 40-2 may convey radio-frequency signals in at least the cellular low band, the cellular midband, and the cellular high band. This may allow antennas 40-1 and 40-2 to perform MIMO communications in one or more of these bands, thereby maximizing data throughput.

In the example of FIG. 5, segment 68 has less overall length than segment 70 (e.g., longitudinal axis 76 of device 10 runs through segment 70 but not segment 68). It can therefore be difficult to configure antenna 40-1 to cover relatively low frequencies with the same antenna efficiency as antenna 40-2, such as frequencies within the cellular low band. In addition, ground extension 74 may have a relatively large size, such as in scenarios where ground extension 74 is formed from a relatively large data connector such as a data connector that supports data transfer using a USB-C protocol (e.g., a USB-C connector or port). The presence of ground extension 74 may also make it difficult for one or both of antennas 40-1 and 40-2 to cover the cellular low band.

Figure 6:
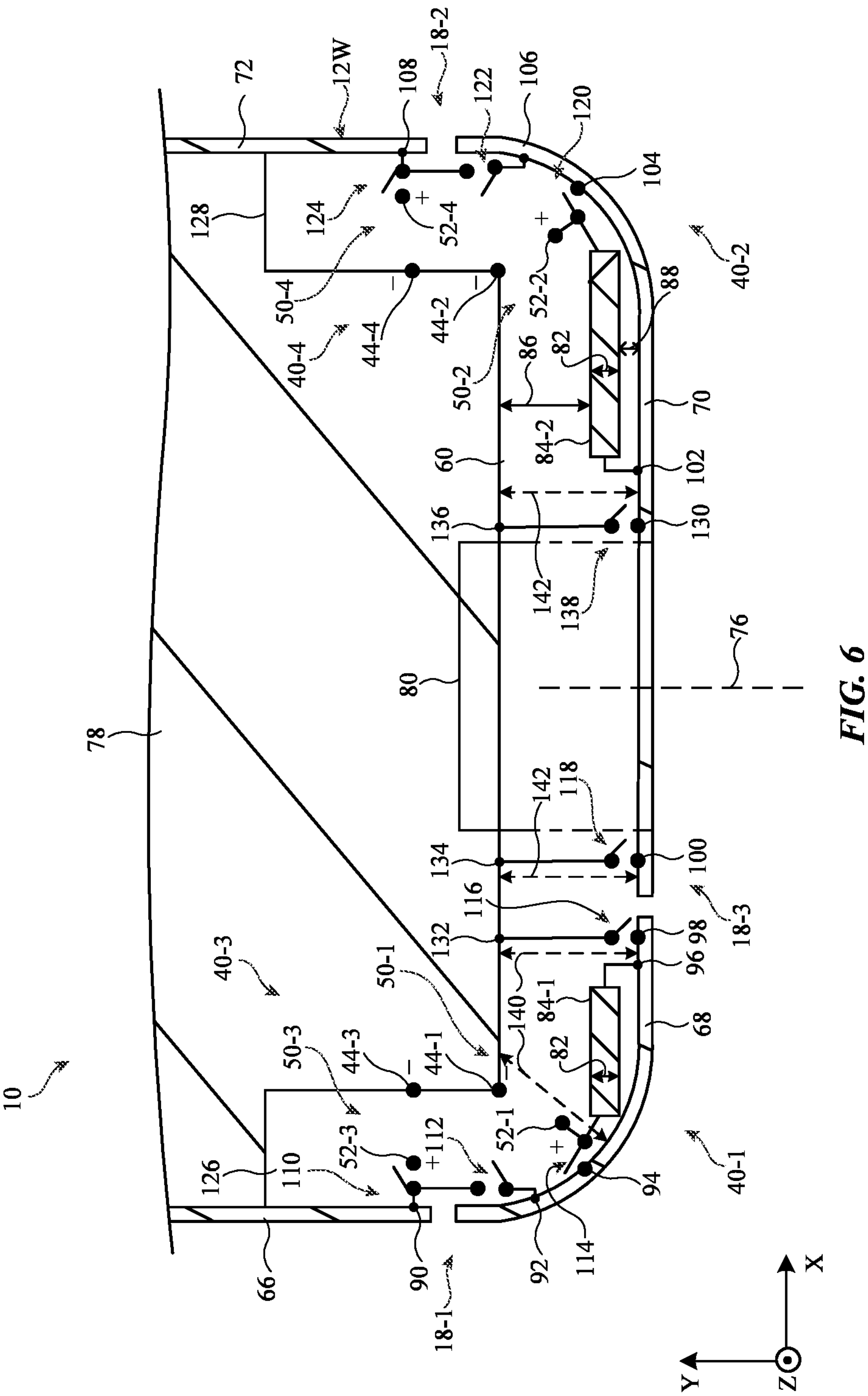
FIG. 6 is a top interior view of the lower end of an illustrative electronic device having first and second antennas that are separated by a dielectric gap and that may selectively cover a cellular low band in accordance with some embodiments.

FIG. 6 is an interior view showing how antennas 40-1 and 40-2 may be configured to overcome these challenges to both cover relatively low frequencies such as frequencies within the cellular low band. As shown in FIG. 6, antenna 40-1 may have an antenna resonating element arm formed from segment 68 of peripheral conductive housing structures 12W. Antenna 40-1 may be fed using an antenna feed 50-1 coupled across slot 60. Antenna feed 50-1 may have a positive antenna feed terminal 52-1 coupled to segment 68 and may have a ground antenna feed terminal 44-1 coupled to ground structures 78. Positive antenna feed terminal 52-1 may be switchably coupled to point (terminal) 94 on segment 68 by a switching circuit such as switch 114. Antenna 40-1 may have a return path formed from switchable component 116 coupled between point (terminal) 132 on ground structures 78 and point (terminal) 98 on segment 68. Switchable component 116 may sometimes be referred to herein as an adjustable component or a tuning element. Point 98 may be located at or adjacent to dielectric gap 18-3, for example. Switchable component 116 may include one or more switches, inductors, resistors, and/or capacitors.

Slot 60 may include a vertical portion that extends parallel to longitudinal axis 76 (e.g., the Y-axis of FIG. 6) and beyond gap 18-1. As shown in FIG. 6, slot 60 may include an extended (elongated) portion 126. Extended portion 126 of slot 60 may extend between segment 66 and ground structures 78 (e.g., segment 66 and ground structures 78 may define opposing edges of extended portion 126), parallel to longitudinal axis 76 and the Y-axis. Extended portion 126 of slot 60 may have an open end at gap 18-1 and an opposing closed end formed from ground structures 78. Extended portion 126 of slot 60 may sometimes be referred to herein simply as slot 126. Slot 126 may form a slot antenna resonating element for antenna 40-3. Antenna 40-3 may be fed by antenna feed 50-3 coupled across slot 126. Antenna feed 50-3 may include a positive antenna feed terminal 52-3 coupled to segment 66 and a ground antenna feed terminal 44-3 coupled to ground structures 78.

Positive antenna feed terminal 52-3 may be switchably coupled to point (terminal) 90 on segment 66 by a switching circuit such as switch 110. Point 90 may be located at or adjacent to gap 18-1. Point 90 may also be coupled to point (terminal) 92 on segment 68 via a switching circuit such as switch 112 (e.g., switch 112 may bridge gap 18-1). Point 92 may be located at or adjacent to gap 18-1. Switch 110 may be opened (e.g., turned off to create an open circuit or infinite impedance between positive antenna feed terminal 52-3 and both points 90 and 92) to deactivate antenna feed 50-3 and antenna 40-3. When switch 110 is opened, switch 112 may be closed (e.g., turned off to create a short circuit impedance between points 92 and 90) to extend the radiating volume of antenna 40-1 to include at least some of slot 126, if desired. Switch 112 may, for example, be toggled to tune the frequency response of antenna 40-1 in one or more bands. When switch 110 is closed, antenna feed 50-3 and antenna 40-3 may be active to radiate in one or more frequency bands. If desired, switch 112 may be opened when switch 110 is closed. Switch 110 and/or switch 112 may include one or more inductive, resistive, capacitive, and/or switches arranged in any desired manner for tuning the frequency response of antennas 40-1 and/or 40-3, if desired.

While positive antenna feed terminal 52-1 is coupled to a first location on segment 68 (e.g., point 94) via switch 114, positive antenna feed terminal 52-1 may also be coupled to a second location on segment 68 such as point (terminal) 96 via conductive trace 84-1 overlapping slot 60. The structure of antennas 40-2 and 40-4 may mirror the structure of antennas 40-1 and 40-3 about longitudinal axis 76, respectively, despite the fact that segment 70 is longer than segment 68. As shown in FIG. 6, antenna 40-2 may have an antenna resonating element arm formed from segment 70 of peripheral conductive housing structures 12W. Antenna 40-2 may be fed using an antenna feed 50-2 coupled across slot 60. Antenna feeds 50-2 and 50-1 may be coupled to and fed by respective transmission lines (e.g., transmission line 42 of FIG. 3). Antenna feed 50-2 may have a positive antenna feed terminal 52-2 coupled to segment 70 and may have a ground antenna feed terminal 44-2 coupled to ground structures 78. Positive antenna feed terminal 52-2 may be switchably coupled to point (terminal) 104 on segment 70 by a switching circuit such as switch 120. Antenna 40-2 may have one or more return paths such as a first return path formed from switchable component 118 coupled between point (terminal) 134 on ground structures 78 and point (terminal) 100 on segment 68 and optionally a second return path formed from switchable component 138 coupled between point (terminal) 136 on ground structures 78 and point (terminal) 130 on segment 70. Switchable components 118 and 138 may sometimes be referred to herein as adjustable components or tuning elements. Switchable components 116 and 138 may include one or more switches, inductors, resistors, and/or capacitors. Point 100 may be located at or adjacent to gap 18-3, for example.

A data connector such as data connector 80 may pass over slot 60 and through an opening in segment 70 (e.g., at the exterior of the device). Data connector 80 may be used to receive a mating data connector to charge a battery on device 10 and/or to convey data between device 10 and an external device. Data connector 80 may be a USB-C connector, for example. Points 100 and 130 may be located on opposing sides of data connector 80, for example. Longitudinal axis 76 of device 10 may pass through (e.g., bisect) data connector 80.

Slot 60 may include a vertical portion that extends parallel to longitudinal axis 76 (e.g., the Y-axis of FIG. 6) and beyond gap 18-2. As shown in FIG. 6, slot 60 may include an extended (elongated) portion 128. Extended portion 128 of slot 60 may extend between segment 72 and ground structures 78 (e.g., segment 72 and ground structures 78 may define opposing edges of extended portion 128), parallel to longitudinal axis 76 and the Y-axis. Extended portion 128 of slot 60 may have an open end at gap 18-2 and an opposing closed end formed from ground structures 78. Extended portion 128 of slot 60 may sometimes be referred to herein simply as slot 128. Slot 128 may form a slot antenna resonating element for antenna 40-4. Antenna 40-4 may be fed by antenna feed 50-4 coupled across slot 128. Antenna feed 50-4 may include a positive antenna feed terminal 52-4 coupled to segment 72 and a ground antenna feed terminal 44-4 coupled to ground structures 78.

Positive antenna feed terminal 52-4 may be switchably coupled to point (terminal) 108 on segment 72 by a switching circuit such as switch 124. Point 108 may be located at or adjacent to gap 18-2. Point 108 may also be coupled to point (terminal) 106 on segment 70 via a switching circuit such as switch 122 (e.g., switch 122 may bridge gap 18-2). Point 106 may be located at or adjacent to gap 18-2. Switch 124 may be opened to deactivate antenna feed 50-4 and antenna 40-4. When switch 124 is opened, switch 122 may be closed to extend the radiating volume of antenna 40-2 to include at least some of slot 128, if desired. Switch 122 may, for example, be toggled to tune the frequency response of antenna 40-2 in one or more bands. When switch 124 is closed, antenna feed 50-4 and antenna 40-4 may be active to radiate in one or more frequency bands. If desired, switch 122 may be opened when switch 124 is closed. Switch 124 and/or switch 122 may include one or more inductive, resistive, capacitive, and/or switches arranged in any desired manner for tuning the frequency response of antennas 40-2 and/or 40-4, if desired.

While positive antenna feed terminal 52-2 is coupled to a first location on segment 70 (e.g., point 104) via switch 120, positive antenna feed terminal 52-2 may also be coupled to a second location on segment 70 such as point (terminal) 102 via conductive trace 84-2 overlapping slot 60. The length of the resonating element arm of antenna 40-2 (segment 70) may be selected so that antenna 40-2 radiates at desired operating frequencies such as frequencies in a cellular low band (e.g., a frequency band between about 600 MHz and 960 MHz), a cellular low-midband (e.g., a frequency band between about 1410 MHz and 1510 MHz), a cellular midband (e.g., a frequency band between about 1710 MHz and 2170 MHz), and/or a cellular ultra-high band (e.g., a frequency band between about 3400 MHz and 3600 MHz).

For example, the length of segment 70 extending from point 104 to gap 18-3 and/or the length of segment 70 extending from point 104 to gap 18-2 may be selected to cover frequencies in the cellular low-midband, the cellular midband, the cellular high band, and/or the cellular ultra-high band (e.g., in a fundamental and/or harmonic mode(s)). In the fundamental mode, these lengths may be approximately equal to one-quarter of the wavelength corresponding to a frequency in the frequency band of interest (e.g., where the wavelength is an effective wavelength that accounts for dielectric loading by the dielectric materials in slot 60). Antenna 40-2 may cover these bands when switch 120 is closed to couple positive antenna feed terminal 52-2 to point 104, for example. If desired, switch 120 may decouple positive antenna feed terminal 52-2 from conductive trace 84-2 when coupling positive antenna feed terminal 52-2 to point 104.

The length of segment 70 between gaps 18-3 and 18-2 (or some subset thereof) may be selected to cover relatively low frequencies such as frequencies in the cellular low band. For example, this length may be selected to be approximately equal to one-quarter of the effective wavelength corresponding to a frequency in the cellular low band. Feeding antenna 40-2 at point 104 (e.g., by closing switch 120) may limit the length of segment 70 that is available to cover the low band. In addition, operations at relatively low frequencies such as frequencies in the low band may be particularly susceptible to loading by data connector 80, which is relatively large. This may limit antenna efficiency at frequencies in the low band. Such undesirable loading may be mitigated by using portions of segment 70 that are located farther from data connector 80 and gap 18-3 to cover the low band.

To optimize performance within the low band, switch 120 may be opened and positive antenna feed terminal 52-2 may be coupled to point 102 via conductive trace 84-2. Segment 70 may then be fed via conductive trace 84-2 at point 102. Point 102 may therefore sometimes be referred to herein as a positive antenna feed terminal when switch 120 is open. Opening switch 120 to couple positive antenna feed terminal 52-2 to point 102 may serve to shift electromagnetic hotspots in the cellular low band away from gap 18-3 and data connector 80 and towards gap 18-2. This may serve to minimize loading in the low band by data connector 80, as well as by external objects such as the user's body, thereby maximizing antenna efficiency in the low band. Switchable components 118 and/or 138 may be adjusted to tune the frequency response of antenna 40-2 in the low band.

In some scenarios, point 102 may be directly fed using a dedicated transmission line other than the transmission line coupled to antenna feed 50-2. However, use of a separate transmission line and the corresponding switching circuitry can undesirably attenuate the radio-frequency signals conveyed by the antenna. This attenuation may be eliminated by using the same radio-frequency transmission line to convey signals to both points 104 and 102 via positive antenna feed terminal 52-2. At the same time, point 102 is located relatively far from the transmission line for antenna 40-2. If care is not taken, the relatively long conductive path length from the transmission line to point 102 may introduce excessive inductance between the transmission line and point 102 when covering the low band. This inductance may undesirably limit the antenna efficiency for antenna 40-4 in the low band when switch 120 is open.

To minimize the inductance between point 102 and the transmission line coupled to positive antenna feed terminal 52-2, conductive trace 84-2 may have a relatively large width 82. In general, larger (wider) widths 82 may reduce the inductance between the transmission line and point 102 more than shorter (narrower) widths 82. At the same time, width 82 may be limited by the amount of space available between ground structures 78 and segment 70 (e.g., the width of slot 60). As examples, width 82 may be between 2.0 mm and 2.3 mm, between 2.5 mm and 2.9 mm, approximately 2.7 mm, between 1 mm and 4 mm, or any other desired width that balances a reduction in inductance with the amount of available space within slot 60. The length of conductive trace 84-2 (e.g., as measured perpendicular to width 82) may be approximately 20 mm, between 15 mm and 25 mm, between 10 mm and 20 mm, or any other desired length. The ratio of the length of conductive trace 84-2 to width 82 may be between 3 and 10, between 2 and 10, between 5 and 15, between 6 and 10, between 5 and 9, or any other desired ratio, as examples.

Conductive trace 84-2 may be located at a distance 88 from segment 70 and at a distance 86 from ground structures 78 (e.g., conductive trace 84-2 may be separated from ground structures 78 by a first portion of slot 60 and may be separated from segment 70 by a second portion of slot 60). Distance 88 may be shorter than distance 86 if desired. Distance 88 may be selected to allow conductive trace 84-2 to form a distributed capacitance with segment 70 such that when switch 120 is closed (e.g., when positive antenna feed terminal 52-2 is shorted to point 104), conductive trace 84-2 electrically forms a single integral conductor with segment 70. When switch 120 is open (e.g., when positive antenna feed terminal 52-2 feeds point 102 via conductive trace 84-2), conductive trace 84-2 electrically forms an inductor that is coupled in series between positive antenna feed terminal 52-2 and point 102 and that has an inductance that is lower than in scenarios where a conductive line or wire is used to connect positive antenna feed terminal 52-2 to point 102. As examples, distance 86 may be approximately 1.0 mm, between 0.8 mm and 1.2 mm, between 0.6 and 1.4 mm, or any other desired distance. Distance 88 may be approximately 0.5 mm, between 0.3 mm and 0.7 mm, between 0.2 mm and 0.8 mm, between 0.6 mm and 0.1 mm, or any other desired distance that is less than distance 86.

Conductive trace 84-2 may be formed on the dielectric material that is used to fill slot 60 (e.g., dielectric material that forms part of the exterior of device 10) or may be formed on a dielectric substrate mounted within slot 60 (e.g., a plastic block, flexible printed circuit, rigid printed circuit board, dielectric portions of other device components, etc.). Conductive trace 84-2 may be formed using other conductive structures such as stamped sheet metal, metal foil, integral portions of the housing for device 10, and/or any other desired conductive structures. The example of FIG. 6 is merely illustrative. If desired, conductive trace 84-2 may have other shapes (e.g., shapes following straight or meandering paths and having curved and/or straight edges).

When configured in this way, conductive trace 84-2 may form a relatively low-inductance feed line combiner (sometimes referred to as a feed combiner or trace combiner) that allows points 102 and 104 to share the same positive antenna feed terminal 52-2 and thus the same signal conductor of the same transmission line without sacrificing antenna efficiency even though points 102 and 104 are located relatively far apart. Conductive trace 84-2 may sometimes be referred to herein as feed combiner trace 84-2, low inductance trace 84-2, low inductance feed combiner trace 84-2, low inductance feed line combiner trace 84-2, fat trace 84-2, thick trace 84-2, wide trace 84-2, low inductance path 84-2, low inductance feed combiner structure 84-2, or feed line inductance limiting structure 84-2.

Similarly, in antenna 40-1, the length of segment 68 extending from point 94 to gap 18-3 and/or the length of segment 68 extending from point 94 to gap 18-1 may be selected to cover frequencies in the cellular low-midband, the cellular midband, the cellular high band, and/or the cellular ultra-high band (e.g., in a fundamental and/or harmonic mode(s)). Antenna 40-1 may cover these bands when switch 114 is closed to couple positive antenna feed terminal 52-1 to point 94, for example. If desired, switch 114 may decouple positive antenna feed terminal 52-1 from conductive trace 84-1 when coupling positive antenna feed terminal 52-1 to point 94.

To increase the effective length of the antenna resonating element arm in antenna 40-1 despite the fact that segment 68 is shorter than segment 70 in the example of FIG. 6, the length from positive antenna feed terminal 52-1 through conductive trace 84-1 to point 96 plus the length from point 96 to gap 18-1 may form the antenna resonating element arm for antenna 40-1 in the low band. This length may therefore be selected to cover frequencies in the low band. Switch 114 may be opened to decouple positive antenna feed terminal 52-1 from point 94 when covering the low band, for example. Switchable component 116 may be adjusted to tune the frequency response of antenna 40-1 in the cellular low band, if desired. When covering the low band, segment 68 may then be fed via conductive trace 84-1 at point 96. Point 96 may therefore sometimes be referred to herein as a positive antenna feed terminal when switch 114 is open. Opening switch 114 to couple positive antenna feed terminal 52-1 to point 96 may serve to shift electromagnetic hotspots in the cellular low band away from gap 18-3 and data connector 80 and towards gap 18-1. This may serve to minimize loading in the low band by data connector 80, as well as by external objects such as the user's body, thereby maximizing antenna efficiency in the low band.

To minimize the inductance between point 96 and the transmission line coupled to positive antenna feed terminal 52-1, conductive trace 84-1 may have a relatively large width 82, may be separated from ground structures 78 by a relatively large distance such as distance 86, and may be separated from segment 68 by a relatively small distance such as distance 88. Conductive trace 84-1 may be formed on the dielectric material that is used to fill slot 60 (e.g., dielectric material that forms part of the exterior of device 10) or may be formed on a dielectric substrate mounted within slot 60 (e.g., a plastic block, flexible printed circuit, rigid printed circuit board, dielectric portions of other device components, etc.). Conductive trace 84-1 may be formed using other conductive structures such as stamped sheet metal, metal foil, integral portions of the housing for device 10, and/or any other desired conductive structures. The example of FIG. 6 is merely illustrative. If desired, conductive trace 84-1 may have other shapes (e.g., shapes following straight or meandering paths and having curved and/or straight edges).

When configured in this way, conductive trace 84-1 may form a relatively low-inductance feed line combiner (sometimes referred to as a feed combiner or trace combiner) that allows points 94 and 96 to share the same positive antenna feed terminal 52-1 and thus the same signal conductor of the same transmission line without sacrificing antenna efficiency even though points 94 and 96 are located relatively far apart. Conductive trace 84-1 may sometimes be referred to herein as feed combiner trace 84-1, low inductance trace 84-1, low inductance feed combiner trace 84-1, low inductance feed line combiner trace 84-1, fat trace 84-1, thick trace 84-1, wide trace 84-1, low inductance path 84-1, low inductance feed combiner structure 84-1, or feed line inductance limiting structure 84-1.

The presence of data connector 80 at segment 70 may limit device 10 to using only one of antenna 40-1 or 40-2 to cover the low band at any given time. While switch 114 is shown only as coupling positive antenna feed terminal 52-1 and conductive trace 84-1 to point 94 in FIG. 6 for the sake of clarity, switch 114 may also have a state in which switch 114 forms a short circuit path from point 94 to ground structures 78 at frequencies in the low band. When antenna 40-2 is actively covering the low band (e.g., while switch 120 is open or otherwise coupling positive antenna feed terminal 52-2 to point 102 via conductive trace 84-2), switchable component 116 and/or switch 114 in antenna 40-1 and may be controlled to form short circuit paths to ground at frequencies in the low band, as shown by arrows 140. This may effectively kill any low band resonance of antenna 40-1 while antenna 40-2 is covering the low band, minimizing interference between the antennas and the impact of data connector 80 on low band communications. Antenna 40-1 and positive antenna feed terminal 52-1 may still cover other frequency bands while antenna 40-2 covers the low band (e.g., switch 114 may still couple positive antenna feed terminal 52-1 to point 94 at frequencies greater than the low band while also forming a short circuit impedance from point 94 to ground structures 78 at frequencies in the low band).

Conversely, when antenna 40-1 is actively covering the low band (e.g., while switch 114 is open or otherwise coupling positive antenna feed terminal 52-1 to point 96 via conductive trace 84-1), switchable component 118 and/or switchable component 138 of antenna 40-2 may form short circuit impedances between segment 70 and ground structures 78 at frequencies in the low band, as shown by arrows 142. This may effectively kill any low band resonance of antenna 40-2 while antenna 40-1 is covering the low band, minimizing interference between the antennas and the impact of data connector 80 on low band communications. Control circuitry 38 (FIG. 1) may provide control signals that control the state of the switchable components and switches of FIG. 6. In this way, antennas 40-1 and 40-2 may both cover the cellular low band with satisfactory antenna efficiency (e.g., efficiency bandwidth) while also covering higher frequencies, despite the relatively small volume of antenna 40-1 relative to antenna 40-2 and despite the presence of a relatively large data connector 80. This may, for example, increase the amount of low band diversity achievable with device 10 (e.g., allowing antenna 40-1 to cover the low band when a user's hand or other object is blocking antenna 40-2 and allowing antenna 40-2 to cover the low band when a user's hand or other object is blocking antenna 40-1). However, since only one of antennas 40-1 and 40-2 are able to cover the low band at a given time, antennas 40-1 and 40-2 of FIG. 6 may be incapable of concurrently covering the low band for MIMO operations, thereby limiting data throughput.

Figure 7:
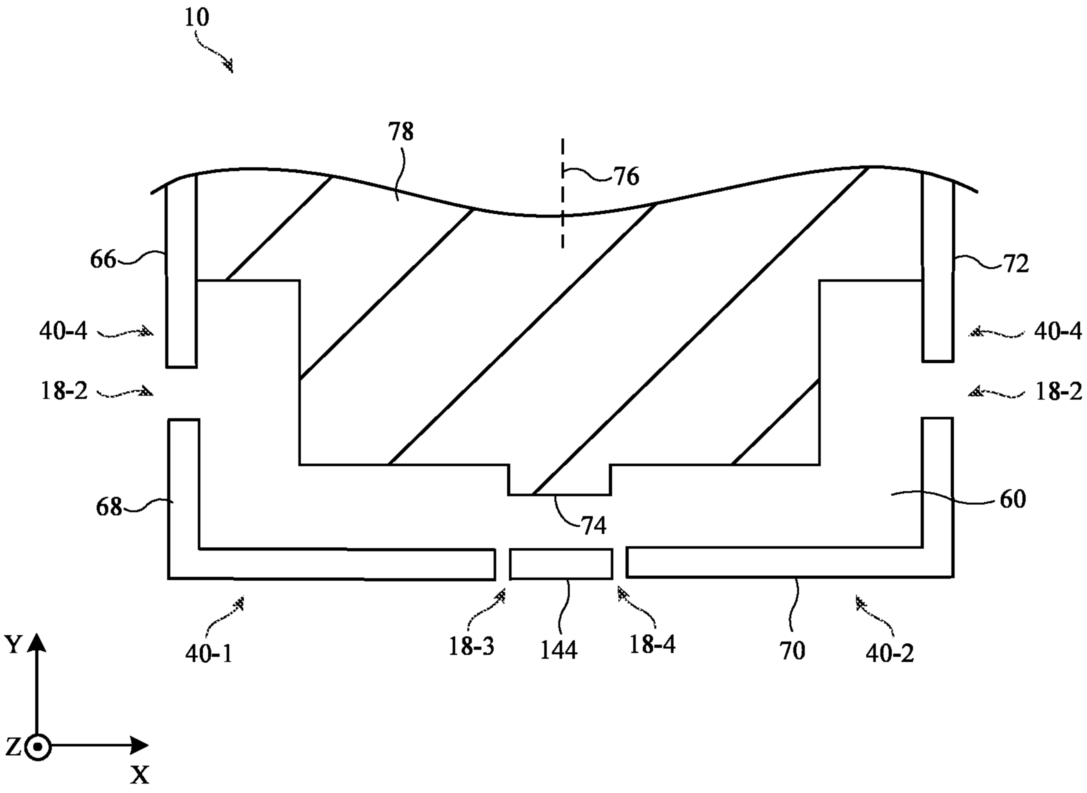
FIG. 7 is a top interior view of the lower end of an illustrative electronic device having peripheral conductive housing structures with first and second dielectric gaps for separating the resonating elements of two antennas in accordance with some embodiments.

To allow antennas 40-1 and 40-2 to concurrently cover the low band (e.g., for performing low band MIMO), peripheral conductive housing structures 12W may be provided with an additional dielectric gap. FIG. 7 is a top interior view showing how an additional dielectric gap may be formed in peripheral conductive housing structures 12W to allow antennas 40-1 and 40-2 to concurrently cover the low band.

As shown in FIG. 7, peripheral conductive housing structures may include an additional dielectric gap such as gap 18-4. Gaps 18-3 and 18-4 may be located at opposing sides of ground extension 74 (e.g., the data connector). When arranged in this way, gap 18-3 may separate segment 68 from an additional segment 144 of peripheral conductive housing structures 12W. Gap 18-4 may separate segment 70 from segment 144. Adding gap 18-4 may increase the amount of symmetry between antennas 40-1 and 40-2 about longitudinal axis 76. For example, segment 70 may be approximately the same length as segment 68. Gaps 18-1 and 18-2 may be disposed in peripheral conductive housing structures 12W at a location higher along the Y-axis than in the arrangement of FIG. 6 if desired, thereby allowing segments 68 and 70 to recover some of the length lost to segment 144 by the introduction of gap 18-4 (e.g., for covering the low band in a fundamental mode).

Figure 8:
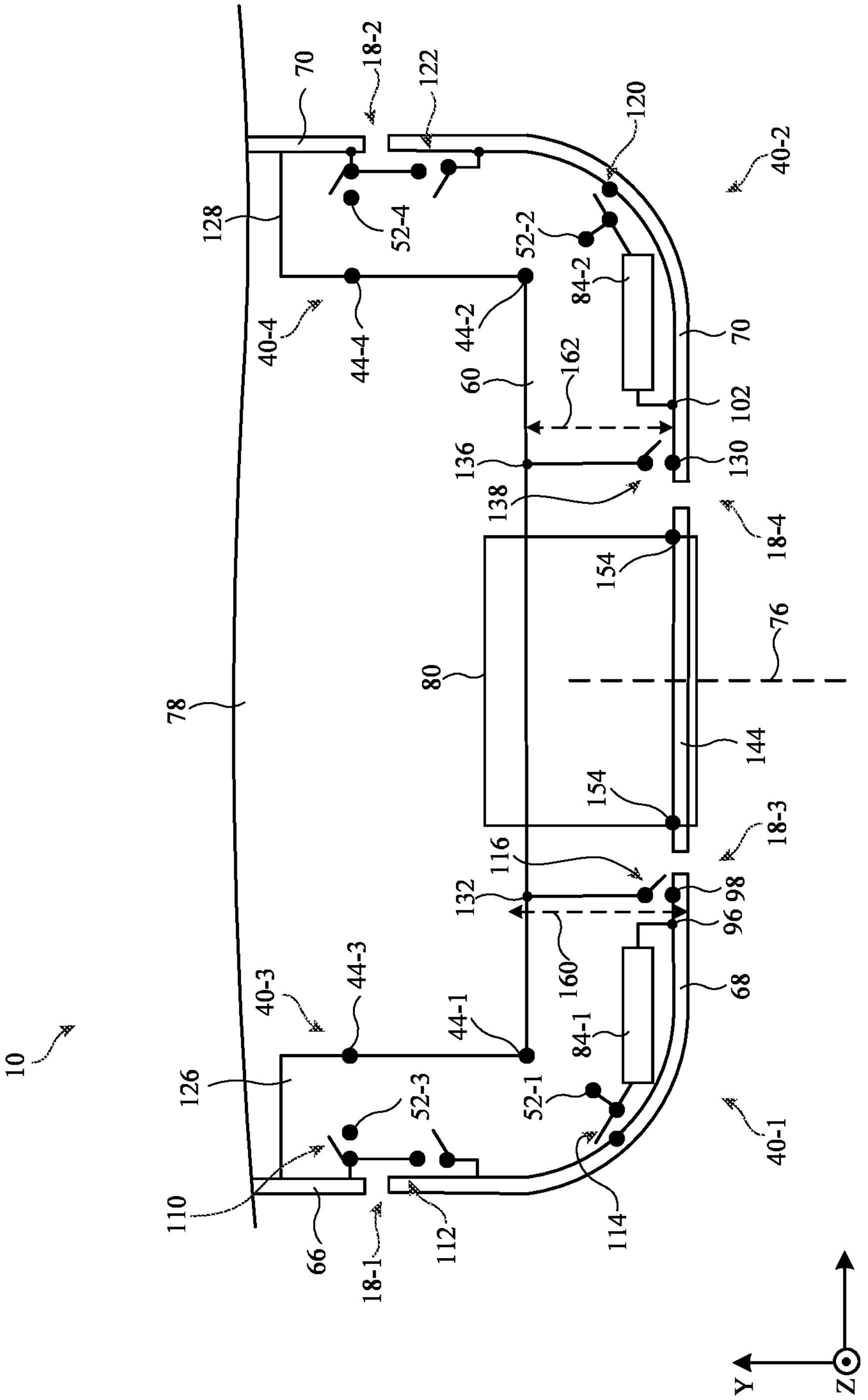
FIG. 8 is a top interior view of the lower end of an illustrative electronic device having first and second antennas that are separated by first and second dielectric gaps and that may concurrently cover a cellular low band in accordance with some embodiments.

FIG. 8 is a diagram showing how antennas 40-1 and 40-2 may be concurrently operated in the low band when peripheral conductive housing structures 12W include gap 18-4 and segment 144. As shown in FIG. 8, data connector 80 may protrude through an opening in segment 144. Data connector 80 may be grounded and may thus form part of ground structures 78. Data connector 80 may also be electrically coupled to segment 114 at one or more locations 154 (e.g., using solder, welds, conductive screws, conductive clips, conductive adhesive, etc.). This may also configure segment 144 to form part of the antenna ground. Grounding data connector 80 and segment 144 in this way, and further separating segment 68 from segment 70 by gap 18-4 and segment 144, may help to isolate antenna 40-1 and antenna 40-2 from each other and from data connector 80, particularly when covering frequencies in the low band.

The components and operation of antennas 40-1, 40-2, 40-3, and 40-4 in the example of FIG. 8 is the same as in the arrangement of FIG. 6, except antennas 40-1 and 40-2 may concurrently cover the low band with satisfactory antenna efficiency (e.g., for performing low band MIMO operations) in the example of FIG. 8. Switchable component 98 may perform low band tuning for antenna 40-1 (e.g., while conveying antenna current between points 132 and 98 as shown by arrow 160). Switchable component 138 may perform low band tuning for antenna 40-2 (e.g., while conveying antenna current between points 136 and 130 as shown by arrow 162). While conductive trace 84-2 may be longer than conductive trace 84-1 in the arrangement of FIG. 6, conductive trace 84-2 may be the same length as conductive trace 84-1 in the arrangement of FIG. 8. Segments 68 and 70 may be the same length in the arrangement of FIG. 8, and gaps 18-1 and 18-2 may be moved further upwards on device 10 to increase the antenna efficiency in the low band for both antennas 40-1 and 40-2.

The examples of FIGS. 6 and 8 are merely illustrative. Conductive traces 84-1 and 84-2 need not be straight/rectangular traces and may, if desired, have other shapes (e.g., conductive trace 84-1 and/or conductive trace 84-2 may follow a meandering path and may have any desired number of straight and/or curved sides). If desired, conductive trace 84-1 may extend rightwards past dielectric gap 18-3 of FIGS. 6 and 8, such that conductive trace 84-1 at least partially overlaps segment 70 of peripheral conductive housing structures 12W.

In the example of FIG. 6 in which only one of antenna 40-1 or antenna 40-2 covers the low band at any given time, antenna 40-2 may be configured to boost the wireless performance of antenna 40-1 in the low band via near-field electromagnetic coupling. For example, a near-field electromagnetic coupling between segments 68 and 70 across dielectric gap 18-3 may cause some of segment 70 to form part of the radiating element arm of antenna 40-1 (e.g., an extension of the arm formed by segment 68) at frequencies in the low band. The tuning of antenna 40-2 may be adjusted when antenna 40-1 is radiating in the low band to help accommodate this near-field electromagnetic coupling, thereby helping to boost the antenna efficiency of antenna 40-1 in the cellular low band. If desired, segment 68 and/or segment 70 may include conductive knuckle structures at dielectric gap 18-3 that help to establish this near-field electromagnetic coupling in the low band.

Figure 9:
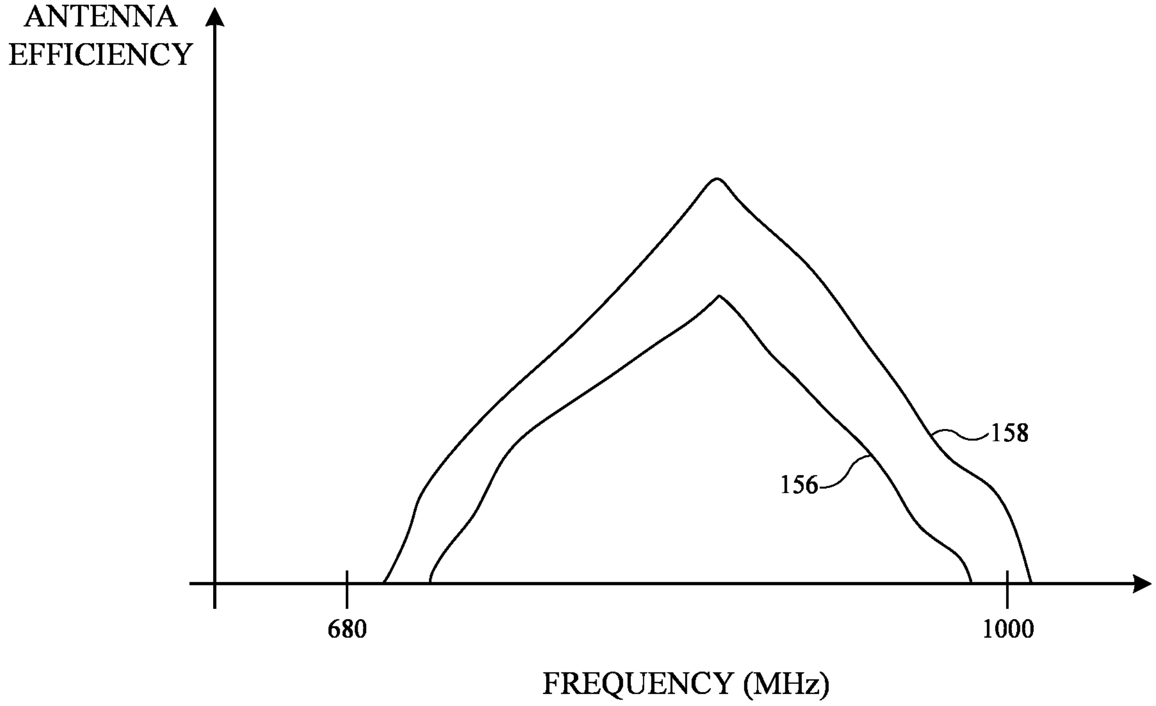
FIG. 9 is a plot showing how a first antenna may be tuned to optimize low band performance of a second antenna via near-field coupling in accordance with some embodiments.

FIG. 9 is a plot showing how antenna 40-2 of FIG. 6 may help to boost the low band performance of antenna 40-1 in the low band. Curve 156 plots the antenna efficiency of antenna 40-1 in the cellular low band when antenna 40-2 is tuned (e.g., using switchable component 118) to optimize the performance of antenna 40-2 in the midband. Antenna 40-2 may have an additional tuning state (e.g., as established by one or more tunable components of antenna 40-2 such as switchable component 118) that maximizes low band near-field coupling between segments 68 and 70 to allow segment 70 of antenna 40-2 to contribute to the low band performance of antenna 40-1. Curve 158 plots the antenna efficiency of antenna 40-1 in the low band when antenna 40-2 is tuned (e.g., using switchable component 118) to boost the low band performance of antenna 40-1 via near-field coupling across dielectric gap 18-3. As shown by curves 156 and 158, adjusting the tuning of antenna 40-2 in this way (e.g., by adjusting the state of switchable component 118) may serve to increase the antenna efficiency of antenna 40-1 across the cellular low band (e.g., by 2 dB or more). Conversely, the tuning of antenna 40-1 (e.g., switchable component 116) may be adjusted to optimize the low band performance of antenna 40-2 via near-field coupling across dielectric gap 18-3. The example of FIG. 9 is merely illustrative and, in practice, curves 156 and 158 may have other shapes.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

peripheral conductive housing structures having first and second segments separated by a first dielectric-filled gap and having a third segment separated from the second segment by a second dielectric-filled gap;

an antenna ground separated from the first, second, and third segments by a slot;

a data connector that extends through an opening in the second segment;

a first positive antenna feed terminal coupled to the first segment by a first switch, wherein the first switch switchably couples the first positive antenna terminal to a first point on the first segment;

a second positive antenna feed terminal coupled to the third segment by a second switch; and a first conductive trace that at least partially overlaps the slot and that couples the first positive antenna feed terminal to a second point on the first segment, the second point being interposed on the first segment between the first point and the first dielectric-filled gap.

2. The electronic device of claim 1, wherein the second switch switchably couples the second positive antenna feed terminal to a third point on the third segment, further comprising:

a second conductive trace that at least partially overlaps the slot and that couples the second positive antenna feed terminal to a fourth point on the third segment, the fourth point being interposed on the third segment between the third point and the second dielectric-filled gap.

3. The electronic device of claim 2, further comprising:

a first tuning element that couples the ground structures to a fifth point on the first segment, the fifth point being interposed on the first segment between the second point and the first dielectric-filled gap.

4. The electronic device of claim 3, further comprising:

a second tuning element that couples the ground structures to a sixth point on the third segment, the sixth point being interposed on the third segment between the fourth point and the second dielectric-filled gap.

5. The electronic device of claim 1, wherein the peripheral conductive housing structures have a fourth segment separated from the third segment by a third dielectric-filled gap, further comprising:

a third positive antenna feed terminal coupled to the fourth segment by a third switch.

6. The electronic device of claim 5, further comprising:

a fourth switch that couples the third segment to the fourth segment.

7. The electronic device of claim 6, wherein the peripheral conductive housing structures have a fifth segment separated from the first segment by a fourth dielectric-filled gap, further comprising:

a fourth positive antenna feed terminal coupled to the fifth segment by a fifth switch; and a sixth switch that couples the first segment to the fifth segment.

8. The electronic device of claim 1, wherein the data connector is grounded to the second segment.

9. The electronic device of claim 8, wherein the first positive antenna feed terminal, the first segment, the second positive antenna feed terminal, and the second segment are configured to concurrently convey radio-frequency signals at a frequency less than or equal to 960 MHZ.

10. The electronic device of claim 1, further comprising:

radio-frequency transceiver circuitry;

a first radio-frequency transmission line path that couples the radio-frequency transceiver circuitry to the first positive antenna feed terminal, wherein the first switch couples the first positive antenna feed terminal to the first segment; and a second radio-frequency transmission line that couples the radio-frequency transceiver circuitry to the second positive antenna feed terminal, wherein the second switch couples the second positive antenna feed terminal to the third segment.

11. An electronic device comprising:

peripheral conductive housing structures having first and second segments separated by a first dielectric-filled gap and having a third segment separated from the second segment by a second dielectric-filled gap;

ground structures separated from the first and second segments by a slot;

a first positive antenna feed terminal coupled to a first point on the first segment by a first switch and coupled to a second point on the first segment by a first conductive trace that at least partially overlaps the slot, the second point being between the first point and the first dielectric-filled gap; and a second positive antenna feed terminal coupled to a third point on the third segment by a second switch and coupled to a fourth point on the second segment by a second conductive trace that at least partially overlaps the slot, the fourth point being between the third point and the second dielectric-filled gap.

12. The electronic device of claim 11, further comprising:

a first tuning element that couples the ground structures to a fifth point on the first segment, the fifth point being between the second point and the first dielectric-filled gap.

13. The electronic device of claim 12, further comprising:

a second tuning element that couples the ground structures to a sixth point on the third segment, the sixth point being between the fourth point and the second dielectric-filled gap.

14. The electronic device of claim 13, further comprising:

a data connector that extends through an opening in the second segment.

15. The electronic device of claim 14, wherein the data connector is shorted to the ground structures and to the second segment.

16. An electronic device comprising:

peripheral conductive housing structures having first and second segments separated by a first dielectric-filled gap and having a third segment separated from the second segment by a second dielectric-filled gap;

ground structures separated from the first and second segments by a slot;

a first trace combiner that at least partially overlaps the slot and that couples a first positive antenna feed terminal to the first segment; and a second trace combiner that at least partially overlaps the slot and that couples the second positive antenna feed terminal to the third segment.

17. The electronic device of claim 16, wherein the first positive antenna feed terminal, the first segment, the first trace combiner, the second positive antenna feed terminal, the third segment, and the second trace combiner are configured to concurrently convey radio-frequency signals at a frequency less than or equal to 960 MHZ.

* * * * *